(12) United States Patent
Hattori et al.

(10) Patent No.: US 9,073,350 B2
(45) Date of Patent: Jul. 7, 2015

(54) OPTICAL SCANNING DEVICE AND IMAGE FORMING APPARATUS WITH SCANNING AREA OF LASER BEAM DIVIDED INTO PLURAL AREAS IN MAIN SCANNING DIRECTION AND VARIATION OF TARGET CORRECTION AMOUNT FOR EACH AREA WITHIN A RANGE OF EACH AREA BEING MUTUALLY EQUAL

(71) Applicant: KYOCERA Document Solutions Inc., Osaka-shi, Osaka (JP)

(72) Inventors: Shota Hattori, Osaka (JP); Hiroshi Abe, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/850,687

(22) Filed: Mar. 26, 2013

(65) Prior Publication Data

US 2013/0258035 A1   Oct. 3, 2013

(30) Foreign Application Priority Data

Mar. 28, 2012 (JP) .................... 2012-073294

(51) Int. Cl.
  B41J 2/435 (2006.01)
  B41J 2/47 (2006.01)
  G03G 15/043 (2006.01)
  H04N 1/04 (2006.01)
  H04N 1/053 (2006.01)

(52) U.S. Cl.
  CPC .............. *B41J 2/47* (2013.01); *G03G 15/043* (2013.01); *H04N 1/0446* (2013.01); *H04N 1/053* (2013.01); *H04N 2201/04789* (2013.01); *H04N 2201/04793* (2013.01)

(58) Field of Classification Search
  CPC .............. B41J 2/442; B41J 2/465; B41J 2/47; B41J 2/471
  USPC .................. 347/236, 237, 246, 247, 252–254; 372/24–26, 29.011, 29.014, 29.015
  See application file for complete search history.

(56) References Cited

U.S. PATENT DOCUMENTS 4,757,191 A * 7/1988 Shimada et al. .............. 250/205
4,813,046 A * 3/1989 Shimada .................... 359/197.1

(Continued)

FOREIGN PATENT DOCUMENTS

JP   2000-71510         3/2000
JP   2008233818 A  * 10/2008  ............. G03G 15/00
JP   2010-94822         4/2010

*Primary Examiner* — Hai C Pham

(74) *Attorney, Agent, or Firm* — Gerald E. Hespos; Michael J. Porco; Matthew T. Hespos

(57) ABSTRACT

The optical scanning device includes a photoreceptor, a light source unit, a plurality of correction value storage units and a light quantity correction unit. The scanning position in the photoreceptor is divided into a plurality of areas. The target correction amount of the light quantity is predetermined so as to change according to the scanning position. The correction value storage unit stores the light quantity correction value that is associated with each of the areas. The light quantity correction unit corrects the light quantity during scanning by using the light quantity correction value corresponding to the scanning position. The length of each of the areas is shorter in an area in which the variation in the target correction amount per unit length is greater. The light quantity correction value is determined based on the target correction amount according to the area corresponding to the light quantity correction value.

5 Claims, 6 Drawing Sheets

(56) References Cited

U.S. PATENT DOCUMENTS

| | | | |
|---|---|---|---|
| 6,370,175 B1* | 4/2002 | Ikeda et al. | 372/38.1 |
| 7,675,532 B2* | 3/2010 | Iida et al. | 347/132 |
| 7,746,370 B2* | 6/2010 | Hata et al. | 347/237 |
| 7,982,760 B2* | 7/2011 | Koga | 347/236 |
| 2007/0216756 A1* | 9/2007 | Komiya et al. | 347/246 |
| 2008/0084469 A1* | 4/2008 | Okada | 347/236 |

* cited by examiner

OPTICAL SCANNING DEVICE AND IMAGE FORMING APPARATUS WITH SCANNING AREA OF LASER BEAM DIVIDED INTO PLURAL AREAS IN MAIN SCANNING DIRECTION AND VARIATION OF TARGET CORRECTION AMOUNT FOR EACH AREA WITHIN A RANGE OF EACH AREA BEING MUTUALLY EQUAL

INCORPORATION BY REFERENCE

This application is based on Japanese Patent Application Serial No. 2012-073294 filed with the Japan Patent Office on Mar. 28, 2012, the contents of which are hereby incorporated by reference.

BACKGROUND

The present disclosure relates to an optical scanning device and an image forming apparatus, and in particular relates to technology of adjusting the light quantity of a laser beam that is used for scanning a photoreceptor.

Conventionally, known is technology of forming a latent image on a peripheral face of a photoreceptor in an optical scanning device provided in an image forming apparatus by reflecting (deflecting) a laser beam emitted from a light source toward the photoreceptor with a rotating polygon mirror or the like, and causing the laser beam to scan the peripheral face of the photoreceptor. Upon writing the latent image with the laser beam, the laser beam passes through a condenser lens before reaching the peripheral face of the photoreceptor. It is known that the exposure value of the laser beam will differ depending on the scanning position on the peripheral face of the photoreceptor due to characteristics of the optical element such as the difference in transmittance between the end part and the center part of the condenser lens.

There is conventional technology which uniformly corrects the exposure value of the laser beam based on the scanning position, as described above. A beam scanning-type image forming apparatus based on this conventional technology includes light source means which generates a laser beam, deflection means which deflects the laser beam generated by the light source means, and scanning/imaging optical means which condenses the laser beam deflected by the deflection means as a light spot on a surface to be scanned, for scanning of the surface to be scanned. With this beam scanning-type image forming apparatus, the scanning position of the light spot is detected, and the light quantity of the light source is controlled in association with the scanning position of the light spot based on the light quantity correction data that has been predetermined corresponding to the detected scanning position.

The foregoing light quantity correction data is stored in the storage means for each of the sections, which are obtained by equally dividing the entire scanning position of the light spot into a predetermined number of sections. In addition, when the light spot is to scan such equally divided sections, the light quantity is corrected by using the light quantity correction data corresponding to the sections, which is stored in the storage means. The value of the light quantity correction data (light quantity correction value) is, for example, set to be great at the both ends of the scanning area and set to be small near the center of the scanning area, mainly in order to avoid the deterioration in the light quantity when the light beam passes through the end part of the lens.

Nevertheless, since the change in the exposure value is great at the both ends of the scanning area of the photoreceptor, it is necessary to divide the area more finely in order to ensure the correction accuracy near the both ends of the scanning area of the photoreceptor. Consequently, there was a drawback in that the number of storage units, such as registers, for storing the light quantity correction value corresponding to the finely divided areas increases.

SUMMARY

The optical scanning device according to one aspect of the present disclosure includes a photoreceptor, a light source unit, a plurality of correction value storage units and a light quantity correction unit.

A latent image is formed on the photoreceptor by scanning thereof with a laser beam. A scanning position of the laser beam is divided into a plurality of areas aligned in a main scanning direction. The light source unit outputs the laser beam and the photoreceptor is scanned in the main scanning direction with the laser beam.

The correction value storage unit stores a light quantity correction value that is predetermined in association with each of the areas. The light quantity correction unit corrects a light quantity when scanning the photoreceptor with the laser beam by using the light quantity correction value stored in the correction value storage unit in association with each of the areas corresponding to the scanning position of the laser beam.

A target correction amount for correcting the light quantity is predetermined according to a position of the photoreceptor in the main scanning direction, and the target correction amount changes according to the position of the photoreceptor in the main scanning direction.

A length, in the main scanning direction, of each area contained in the plurality of areas is shorter in an area in which a correction value change rate, which is a variation in the target correction amount per unit length of the main scanning direction, is greater.

The light quantity correction value is determined based on the target correction amount according to a position of an area corresponding to the light quantity correction value.

DETAILED DESCRIPTION

Figure 1:
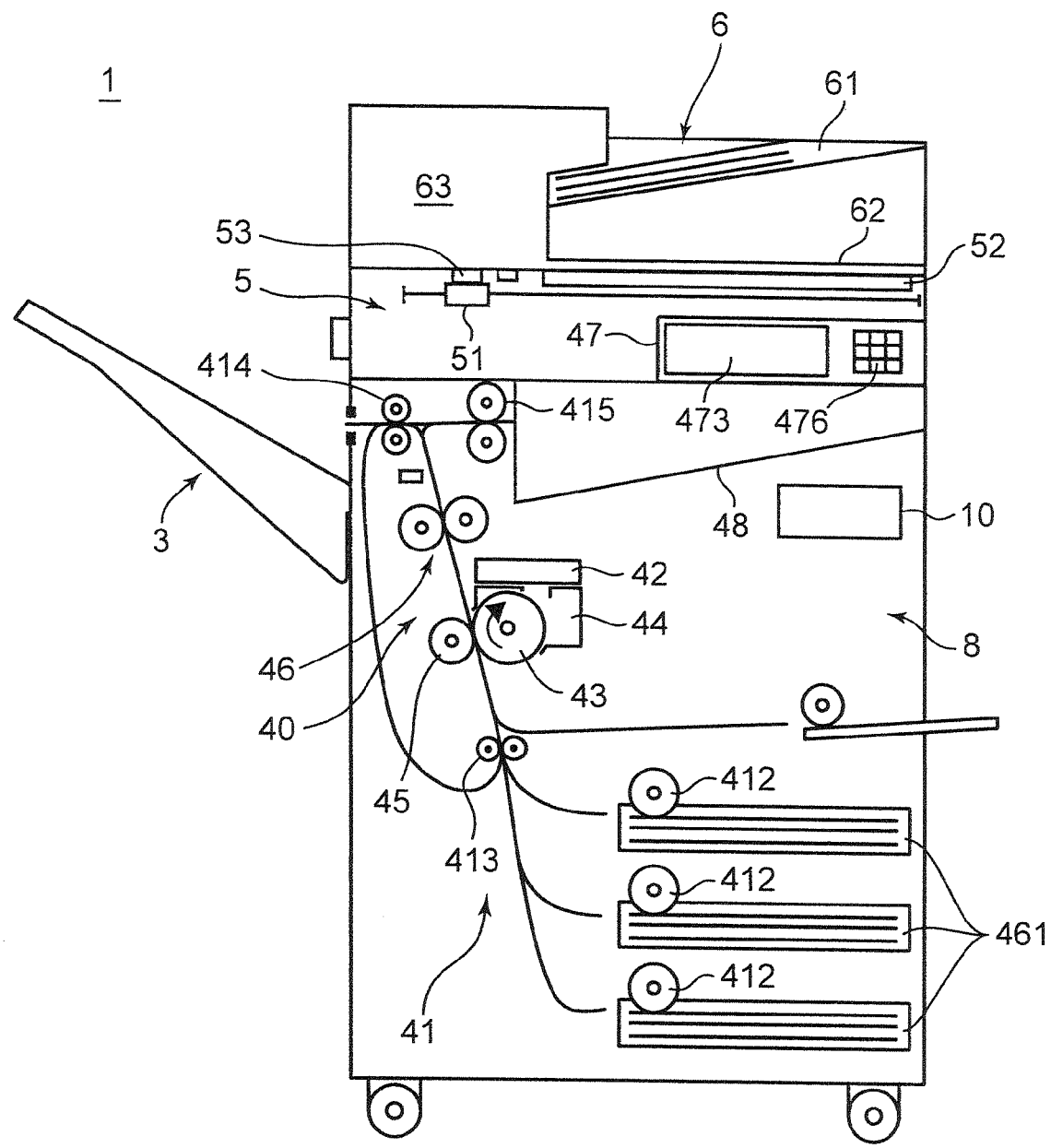
FIG. 1 is a schematic structure diagram of the copying machine according to one embodiment of the image forming apparatus comprising the optical scanning device according to the present disclosure.
Figure 2:
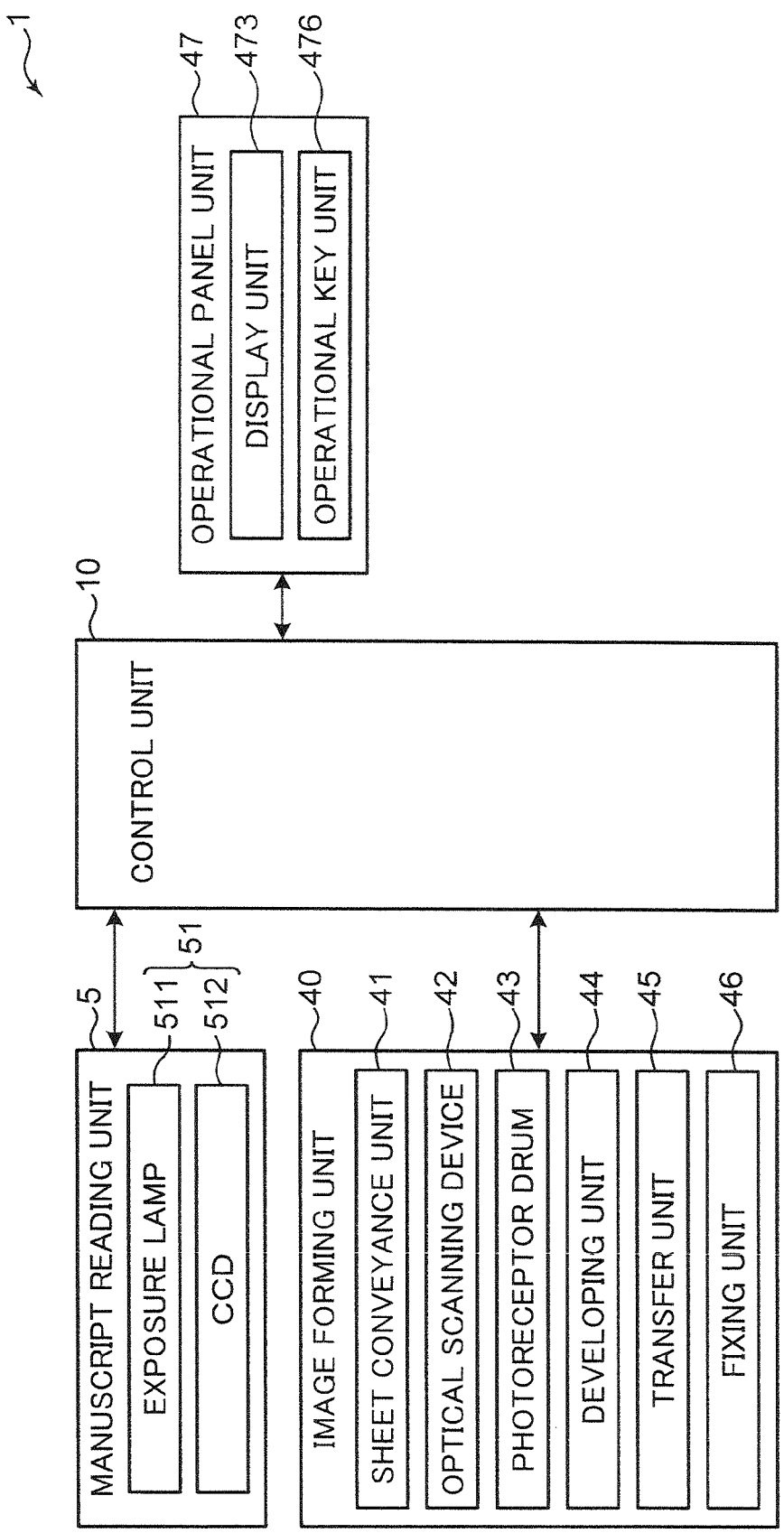
FIG. 2 is a block diagram showing the electrical configuration of the copying machine.

Embodiments of the present disclosure are now explained with reference to the drawings. FIG. 1 is a schematic structure diagram of the copying machine 1 according to one embodiment of the image forming apparatus comprising the optical scanning device according to the present disclosure. FIG. 2 is a block diagram showing the electrical configuration of the copying machine 1.

As shown in FIG. 1, the copying machine 1 includes a main body part 8, a stack tray 3 disposed on the left side of the main body part 8, a manuscript reading unit 5 disposed at the upper part of the main body part 8, and a manuscript feeding unit 6 disposed above the manuscript reading unit 5. A control unit 10 is disposed inside the main body part 8.

A front part of the copying machine 1 is provided with an operational panel unit 47. The operational panel unit 47 includes a display unit 473, and an operational key unit 476. The display unit 473 is configured, for example, from a liquid crystal display or the like having a touch panel function. The operational key unit 476 includes, for example, various key switches such as a start key for a user to input a printing command, or a numerical keypad for inputting the number of sheets to be printed.

The manuscript reading unit 5 includes a scanner unit 51 confirmed from an exposure lamp 511 and a charge coupled device (CCD) 512 or the like (FIG. 2), a manuscript table 52 configured from a transparent member such as glass, and a manuscript reading slit 53.

The scanner unit 51 is configured to be movable by a drive unit not shown. When the scanner unit 51 is to read the manuscript mounted on the manuscript table 52, the scanner unit 51 scans the image of the manuscript while moving along the manuscript surface at a position facing the manuscript table 52, and outputs the acquired image data to the control unit 10. Moreover, when the scanner unit 51 is to read the manuscript fed from the manuscript feeding unit 6, the scanner unit 51 moves to a position facing the manuscript reading slit 53, acquires the image of the manuscript via the manuscript reading slit 53 by synchronizing with the conveyance operation of the manuscript by the manuscript feeding unit 6, and outputs the acquired image data to the control unit 10.

The manuscript feeding unit 6 includes a manuscript mounting unit 61 for mounting the manuscript, a manuscript ejecting unit 62 for discharging the manuscript in which the reading of its image is complete, and a manuscript conveyance mechanism 63. The manuscript conveyance mechanism 63 conveys the manuscript mounted on the manuscript mounting unit 61 one sheet at a time to the position facing the manuscript reading slit 53, and ejects the manuscript, in which the reading of its image is complete, to the manuscript ejecting unit 62.

The main body part 8 includes a plurality of feeding cassettes 461, a plurality of sheet feed rollers 412 which feeds one sheet at a time from each feeding cassette 461 to the image forming unit 40, an image forming unit 40 which forms an image on the sheet that was conveyed from the feeding cassette 461, a ejecting tray 48 to which the sheet with the image formed thereon is ejected, and a control unit 10 which governs the overall control of the device.

The image forming unit 40 includes a sheet conveyance unit 41, an optical scanning device 42, a photoreceptor drum (photoreceptor) 43, a developing unit 44, a transfer unit 45, and a fixing unit 46.

The sheet conveyance unit 41 is provided in the sheet conveyance path in the image forming unit 40. The sheet conveyance unit 41 includes a conveyance roller 413, a conveyance roller 414, a conveyance roller 415, and the like. The conveyance roller 413 supplies, to the photoreceptor drum 43, the sheet that was conveyed by the sheet feed roller 412. The conveyance roller 414 conveys, to the stack tray 3, the sheet on which an image was formed by the image forming unit 40. The conveyance roller 415 conveys, to the ejecting tray 48, the sheet on which an image was formed by the image forming unit 40.

The optical scanning device 42 outputs a laser beam based on the image data input to the control unit 10 based on the control of the control unit 10. The optical scanning device 42 forms an electrostatic latent image on the photoreceptor drum 43 by scanning the photoreceptor drum 43 with a laser beam.

The developing unit 44 forms a toner image by attaching a toner to the electrostatic latent image on the photoreceptor drum 43. The transfer unit 45 transfers the toner image on the photoreceptor drum 43 to the sheet. The fixing unit 46 heats the sheet to which the toner image was transferred and fixes the toner image on the sheet.

The control unit 10 includes, for example, a central processing unit (CPU) for executing predetermined arithmetic processing, a read only memory (ROM) storing predetermined control programs, a random access memory (RAM) for temporarily storing data, an application specific integrated circuits (ASIC) as dedicated hardware configured to enable high speed processing of predetermined processing such as image processing, and the peripheral circuits thereof.

As shown in FIG. 2, connected to the control unit 10 are the manuscript reading unit 5, the image forming unit 40, and the operational panel unit 47. The control unit 10 controls the operation of the respective units in the device by causing the CPU to execute the control programs stored in the ROM or the like, and, for example, executes processing for copying the manuscript image onto the sheet.

Specifically, when the control unit 10 is to execute processing of copying the manuscript image onto the sheet, the control unit 10 causes the manuscript reading unit 5 to read the manuscript image. The control unit 10 forms an electrostatic latent image on the photoreceptor drum 43 by controlling the optical scanning device 42 and causing it to output a laser beam according to the image data indicating the read image. Thereafter, the control unit 10 controls the developing unit 44, the transfer unit 45, the fixing unit 46, and the sheet conveyance unit 41 and forms an image on the sheet.

Figure 3:
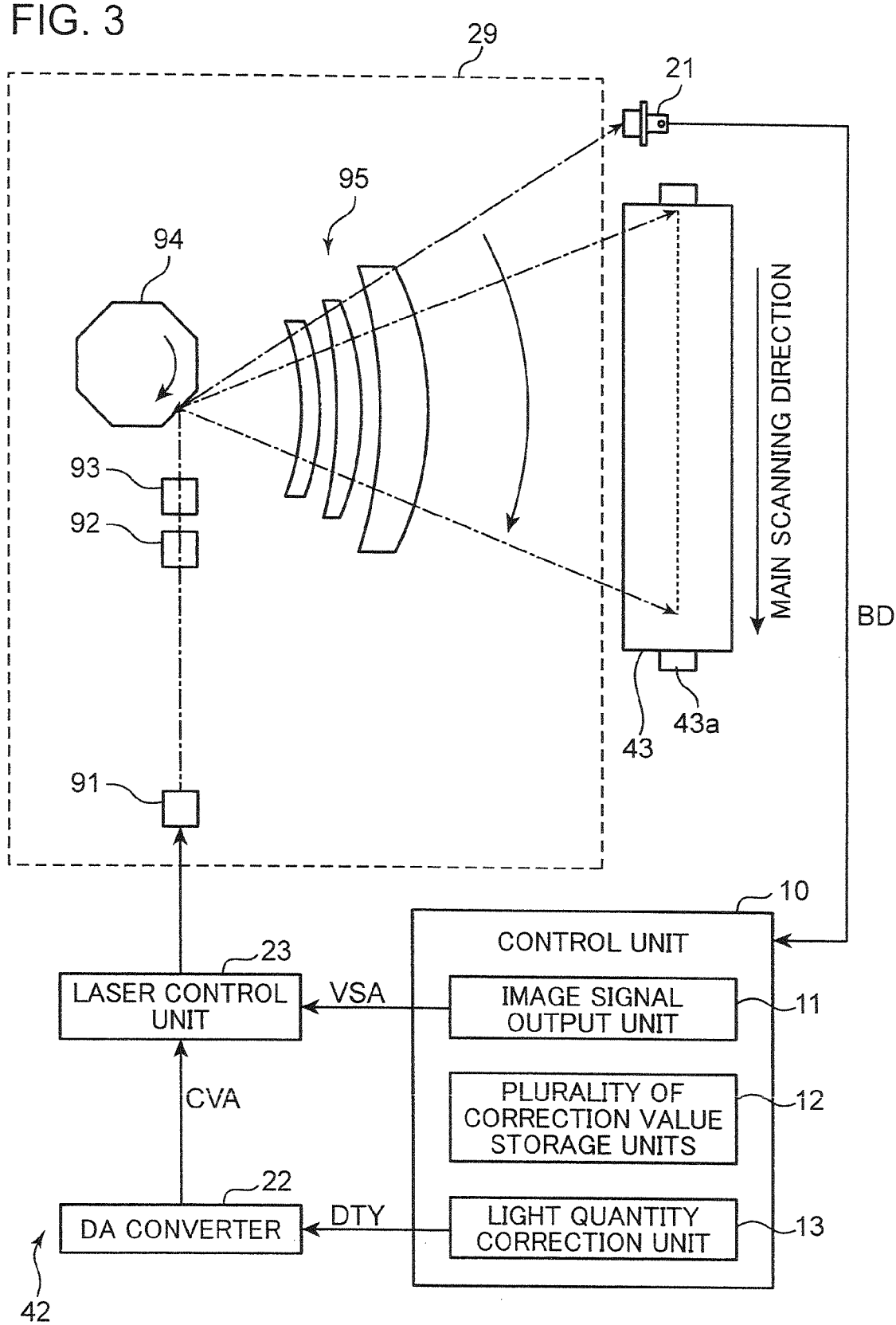
FIG. 3 is a schematic configuration diagram showing the internal configuration of the optical scanning device according to this embodiment.

Among the control performed by the control unit 10, the control of correcting the light quantity of the laser beam to scan the photoreceptor drum 43 is now explained with reference to FIG. 3. FIG. 3 is a schematic configuration diagram showing the internal configuration of the optical scanning device 42 according to this embodiment.

The optical scanning device 42 includes a light source unit 29, a digital to analog (DA) converter 22, a laser control unit 23, and a beam detect (BD) sensor 21. The control unit 10 functions as the image signal output unit 11, the plurality of correction value storage units 12, and the light quantity correction unit 13 for controlling the correction of the light quantity of the laser beam to scan the photoreceptor drum 43.

The light source unit 29 includes a laser beam source 91, a collimator lens 92, a prism 93, a polygon mirror 94, and an f-θ lens 95. The light source unit 29 outputs a laser beam, and uses the laser beam to scan the peripheral face of the photoreceptor drum 43 in the main scanning direction at a substantially constant velocity. The main scanning direction is the extending direction of a support axis 43a which axially supports the photoreceptor drum 43 in a rotatable manner.

The laser beam source 91 outputs a laser beam of a light quantity according to the drive current supplied from the laser control unit 23 described later. The collimator lens 92 condenses the laser beam output from the laser beam source 91. The prism 93 converts the light that passed through the collimator lens 92 into parallel light, and ejects the parallel light toward the polygon mirror 94. The polygon mirror 94 includes a plurality of reflective surfaces for reflecting the incident light toward the photoreceptor drum 43. The polygon mirror 94 rotates at a constant speed in the arrow direction of FIG. 3, for example, based on the drive force of a drive motor not shown. The f-θ lens 95 images the laser beam reflected by the polygon mirror 94 on the peripheral face of the photoreceptor drum 43 in a spot form having a predetermined diameter.

The DA converter 22 generates an analog signal CVA of a signal level corresponding to the light quantity correction value DTY input from the light quantity correction unit 13 described later. The DA converter 22 outputs the generated analog signal CVA to the laser control unit 23.

The laser control unit 23 adjusts the amount of the drive current supplied to the laser beam source 91 according to the signal level of the analog signal CVA input from the DA converter 22. The laser control unit 23 corrects the light quantity of the laser beam output from the laser beam source 91 by adjusting the amount of the drive current supplied to the laser beam source 91.

In addition, the laser control unit 23 switches whether to supply the drive current to the laser beam source 91 according to the image signal VSA input from the image signal output unit 11 described later. When the period that the drive current is supplied to the laser beam source 91 per unit time is long, the size of the dots that are imaged per unit time will increase (number of dots will increase). In the foregoing case, the image density of the latent image formed on the peripheral face of the photoreceptor drum 43 will increase. Meanwhile, when the period that the drive current is supplied to the laser beam source 91 per unit time is short, the size of the dots that are imaged per unit time will decrease (number of dots will decrease). In the foregoing case, the image density of the latent image formed on the peripheral face of the photoreceptor drum 43 will decrease. Accordingly, the light and shade of the latent image formed on the peripheral face of the photoreceptor drum 43 is adjusted according to the period that the drive current is supplied to the laser beam source 91 per unit time.

The BD sensor 21 is provided near the photoreceptor drum within the scanning area of the laser beam and separated a predetermined distance from the end part of the photoreceptor drum 43. Upon receiving the laser beam, the BD sensor 21 outputs, to the control unit 10, a detection signal BD showing that the laser beam has been received.

The image signal output unit 11 comprehends the scanning position of the laser beam based on the multiplication result of the elapsed time from the time that the detection signal BD was input from the BD sensor 21 and the predetermined scanning speed of the laser beam. The image signal output unit 11 outputs, to the laser control unit 23, the image signal VSA adjusted whether to supply the drive current to the laser beam source 91 so as to correspond to the light and shade of the latent image formed at the comprehended scanning position based on one line worth of image data among the image data input to the control unit 10.

For example, the laser control unit 23 supplies the drive current to the laser beam source 91 when the signal level of the image signal VSA input from the image signal output unit 11 is a high level, and stops the supply of the drive current to the laser beam source 91 when the signal level of the image signal VSA is a low level. In the foregoing case, the image signal output unit 11 adjusts the signal level of the image signal VSA to be output so that the high level period per unit time becomes longer upon darkening the latent image formed on the comprehended scanning position based on one line worth of image data among the image data input to the control unit 10. Contrarily, the image signal output unit 11 adjusts the signal level of the image signal VSA to be output so that the high level period per unit time becomes shorter upon lightening the latent image formed on the comprehended scanning position based on one line worth of image data among the image data input to the control unit 10.

The plurality of correction value storage units 12 include a plurality of registers (correction value storage units). The scanning position of the laser beam on the photoreceptor drum is divided into a plurality of areas aligned in the main scanning direction as described above. Each register of the plurality of correction value storage units 12 is associated with each divided area. Each register stores the light quantity correction value DTY which shows the signal level of the analog signal CVA that is used upon correcting the light quantity of the laser beam in cases of scanning each area associated with that register using the laser beam.

The light quantity correction unit 13 comprehends the scanning position of the laser beam based on the multiplication result of the elapsed time from the time that the detection signal BD was input from the BD sensor 21 and the predetermined scanning speed of the laser beam. The light quantity correction unit 13 reads the light quantity correction value DTY from the register associated with the area including the comprehended scanning position among the plurality of registers of the plurality of correction value storage units 12. In addition, the light quantity correction unit 13 outputs the read light quantity correction value DTY toward the DA converter 22.

Figure 4:
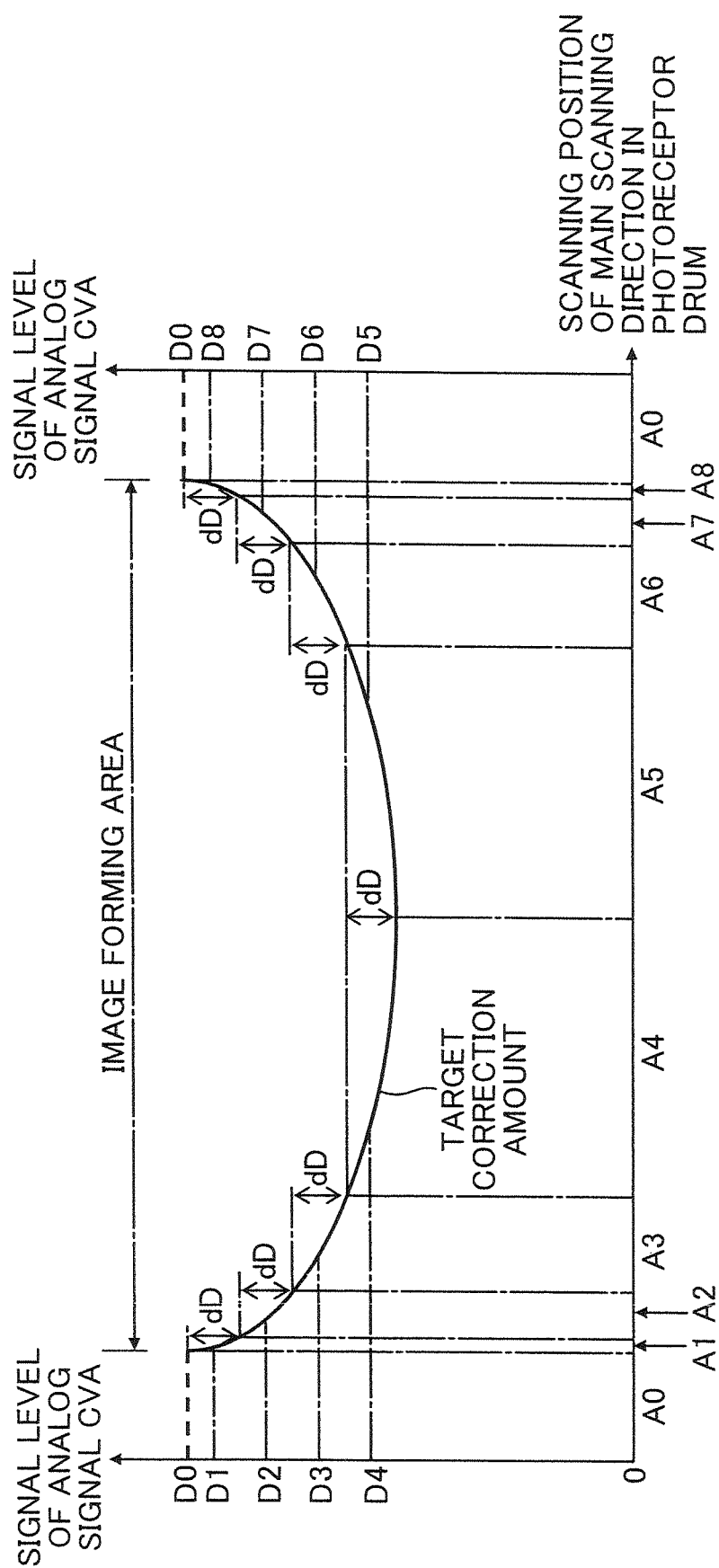
FIG. 4 is an explanatory diagram showing an example of the relation of each area in which the scanning position of the laser beam on the peripheral face of the photoreceptor drum is divided, and each light quantity correction value stored in each correction value storage unit.

The light quantity correction value DTY stored in each register of the plurality of correction value storage units 12 is now explained in detail with reference to FIG. 4. FIG. 4 is an explanatory diagram showing an example of the relation of each of the areas A1 to A8 in which the scanning position of the laser beam was divided in the image forming area, which is the area where the latent image is formed on the peripheral face of the photoreceptor drum 43, and each of the light quantity correction values D1 to D8 stored in each register associated with each of the areas A1 to A8.

The distance of the light path of the laser beam from the laser beam source 91 to the photoreceptor drum 43 differs due to optical characteristics such as the incidence angle relative to the f-θ lens 95 or the thickness of the f-θ lens 95. Consequently, the exposure value of the laser beam upon scanning the peripheral face of the photoreceptor drum 43 will differ according to the scanning position.

For example, with a standard optical scanning device, upon scanning the peripheral face of the photoreceptor drum 43 with a laser beam, the distance of the light path of the laser beam from the laser beam source 91 to the photoreceptor drum 43 becomes shorter as the scanning position of the laser beam approaches the center part of the photoreceptor drum 43. Thus, the exposure value of the laser beam increases as the scanning position of the laser beam approaches the center part of the photoreceptor drum 43. Contrarily, the distance of the light path of the laser beam from the laser beam source 91 to the photoreceptor drum 43 becomes longer as the scanning position of the laser beam approaches the both end parts from the center part of the photoreceptor drum 43. Thus, the exposure value of the laser beam decreases as the scanning position of the laser beam approaches the both end parts from the center part of the photoreceptor drum 43.

Thus, with a standard optical scanning device, correction is performed to weaken the light quantity of the laser beam to be output by the laser beam source 91 as the scanning position of the laser beam approaches the center part of the photoreceptor drum 43, and strengthen the light quantity of the laser beam to be output by the laser beam source 91 as the scanning position of the laser beam approaches the both end parts from the center part of the photoreceptor drum 43.

In this embodiment, in order to correct the light quantity of the laser beam, the target correction amount showing the signal level of the analog signal CVA according to the scanning position of the laser beam is predetermined, for example, as shown in FIG. 4, based on the measured value and the like obtained from test working. In FIG. 4, the target correction amount is set so that the target correction amount changes slightly as the scanning position of the laser beam approaches the center part of the photoreceptor drum 43, and changes greatly as the scanning position of the laser beam approaches the both ends from the center part of the photoreceptor drum 43.

Based on this target correction amount, the scanning position of the laser beam on the photoreceptor drum 43 is divided into a plurality of areas aligned in the main scanning direction. The length of each area in the main scanning direction is shorter for an area in which the correction value change rate, which is the variation in the target correction amount per unit length of the main scanning direction, is greater, and longer for an area in which the correction value change rate is smaller. Note that the length of each area in the main scanning direction is stored in the ROM or the like.

For example, in FIG. 4, the scanning position of the laser beam in the image forming area is divided into the eight areas shown with symbols A1 to A8. At the scanning position corresponding to the areas A1, A2, A7 and A8 near the both ends of the photoreceptor drum 43, since the correction value change rate, which is the variation in the target correction amount per unit length of the main scanning direction, is great, the length of each area in the main scanning direction is short. Meanwhile, at the scanning position corresponding to the areas A4 and A5 near the substantial center of the photoreceptor drum 43, since the correction value change rate is small, the length of each area in the main scanning direction is long.

When attempting to scan the area near the both ends of the photoreceptor drum 43 with a laser beam, the laser beam may become diffused due to the rotating axis or the like of the photoreceptor drum 43, and affect the image quality of the latent image. Thus, the area shown with the symbol A0 near the both ends of the photoreceptor drum 43 is predetermined as an area (drawing prohibited area) in which the scanning by the laser beam is prohibited. Note that the signal level of the analog signal CVA showing the symbol D0 shows the light quantity of the laser beam when a latent image is not formed on the photoreceptor drum 43. In other words, the signal level of the analog signal CVA shown with the symbol D0 is predetermined as the signal level showing the initial value of the light quantity of the laser beam when the light quantity is not to be corrected, and stored in the ROM, the register or the like.

The areas A1 to A8 are generated by being repeatedly divided into two different areas with the scanning position thereof as the boundary each time the variation in the target correction amount exceeds dD. For example, the areas A1 to A8 are divided into the two areas of an area A1, and an area configured from areas A2 to A8, with the scanning position where the target correction amount becomes lower by dD than the signal level D0, which is the initial state of the target correction amount, as the boundary. Next, the area configured from areas A2 to A8 is further divided into the two areas of an area A2, and an area configured from areas A3 to A8, with the scanning position in which the target correction amount becomes additionally lower by dD as the boundary. The eight areas A1 to A8 are generated by repeating the foregoing process. In other words, within the range of each of the areas A1 to A8, the variation showing the difference between the maximum value and the minimum value of the target correction amount corresponding to each of the areas A1 to A8 is set as dD, and the image forming area is divided so that the variation in the target correction amount among each of the areas A1 to A8 becomes mutually equal.

Moreover, each light quantity correction value DTY corresponding to each area is set based on the target correction amount according to the scanning position corresponding to each of the divided areas. Each light quantity correction value DTY corresponding to each area is stored in each register associated with each area among the plurality of registers provided to the plurality of correction value storage units 12.

For example, in FIG. 4, the average value D1 of the target correction amount according to the scanning position corresponding to the area A1 is set as the light quantity correction value DTY corresponding to the area A1. The light quantity correction value D1 corresponding to the area A1 is stored in the register associated with the area A1 among the eight registers of the plurality of correction value storage units 12. Similarly, the average values D2 to D8 of the target correction amount according to the scanning position corresponding to each of the areas A2 to A8 are respectively set as the light quantity correction value DTY corresponding to each of the areas A2 to A8. The light quantity correction values D2 to D8 corresponding to each of the areas A2 to A8 are respectively stored in each register associated with each of the areas A2 to A8 among the eight registers of the plurality of correction value storage units 12.

Figure 5:
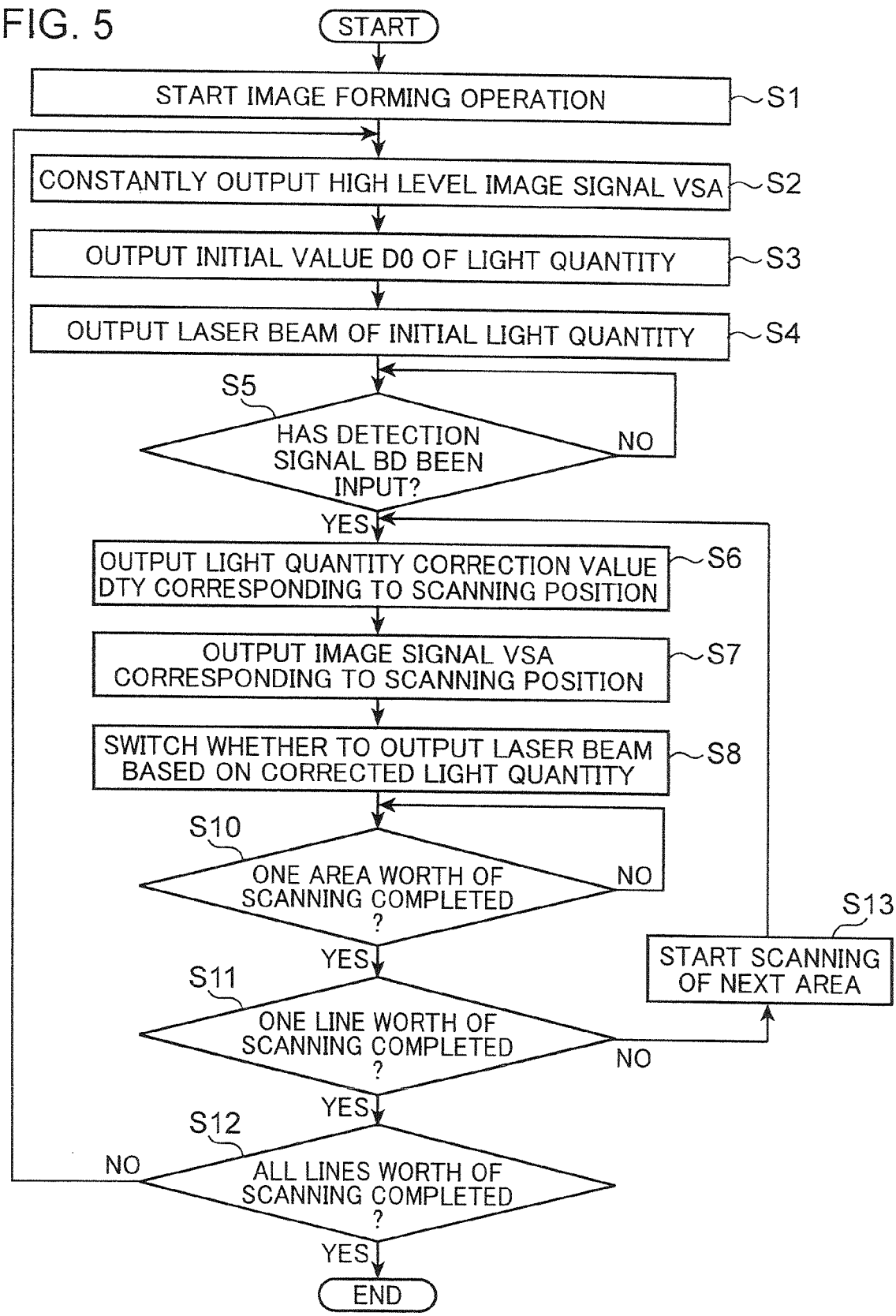
FIG. 5 is a flowchart showing the control operation of correcting the light quantity of the laser beam upon scanning the photoreceptor drum.

The control of correcting the light quantity of the laser beam upon scanning the photoreceptor drum 43 is now explained in detail with reference to FIG. 5. FIG. 5 is a flowchart showing the control operation of correcting the light quantity of the laser beam upon scanning the photoreceptor drum 43.

When an execution command of the copy function is input based on the operation of the operational panel unit 47 by the user or other operation, the control unit 10 causes the manuscript reading unit 5 to output the image data, and causes the image forming unit 40 to start the image forming operation according to the image data (S1). The image signal output unit 11 outputs, to the laser control unit 23, an image signal VSA (for instance, a constantly high level signal) showing that the drive current is constantly supplied to the laser beam source 91 (S2).

The light quantity correction unit 13 inputs, to the DA converter 22, a value D0 showing the signal level of the analog signal CVA which is pre-stored in the ROM or the register as the initial value of the light quantity of the laser beam (S3). Consequently, the analog signal CVA of the signal level D0 is output from the DA converter 22 to the laser control unit 23. The laser control unit 23 uses the analog signal CVA of the signal level D0 that was input from the DA converter 22 and causes the laser beam source 91 to constantly output the laser beam of the light quantity (initial light quantity) corresponding to the initial value (S4).

When the detection signal BD showing that the laser beam was received is output by the BD sensor 21 and the detection signal BD is input to the control unit 10 (S5; YES), the light quantity correction unit 13 comprehends the scanning position from the elapsed time or the like from the time that the detection signal BD was input. Subsequently, the light quantity correction unit 13 reads the light quantity correction value DTY from the register associated with the area including the comprehended scanning position of the laser beam provided to the plurality of correction value storage units 12, and outputs the read light quantity correction value DTY to the DA converter 22 (S6).

Meanwhile, the image signal output unit 11 comprehends the scanning position from the elapsed time or the like from the time that the detection signal BD was input. In addition, the image signal output unit 11 outputs, to the laser control unit 23, the image signal VSA showing the light and shade of the latent image formed on the comprehended scanning position based on one line worth of image data among the image data input to the control unit 10 (S7). The laser control unit 23 switches whether to supply the drive current to the laser beam source 91 according to the input image signal VSA. Consequently, the laser control unit switches whether to cause the laser beam source 91 to output the laser beam of the light quantity according to the input analog signal CVA (S8).

The light quantity correction unit 13 determines that the scanning of the relevant area is complete when the time required for scanning the length of the area in the main scanning direction corresponding to the light quantity correction value DTY read in step S6 has elapsed from the time that the light quantity correction value DTY was output to the DA converter 22 in step S6 (S10; YES). Here, the control unit 10 determines whether one line worth of scanning is complete based on the elapsed time from the time that the detection signal BD was input (S11). For example, the control unit 10 determines whether one line worth of scanning is complete based on whether the elapsed time from the time that the detection signal BD was input has reached the predetermined line cycle as the time from the input of the detection signal BD to the completion of one line worth of scanning.

When the control unit 10 determines that one line worth of scanning is not complete (S11; NO), the control unit 10 scans the next area aligned in the main scanning direction with a laser beam. For example, in step S10, when the light quantity correction unit 13 determines that the scanning of the area An is complete, the control unit 10 starts the scanning of the area An+1 with a laser beam (S13). The control unit 10 thereafter causes the light quantity correction unit 13 to execute step S6 once again.

Meanwhile, when the control unit 10 determines that one line worth of scanning is complete in step S11 (S11; YES), the control unit 10 determines whether all lines worth of scanning is complete (S12).

When the control unit 10 determines that all lines worth of scanning is not complete (S12; NO), the control unit 10 rotatively drives the photoreceptor drum 43 at a predetermined rotational angle in order to scan the next line, and advances the processing to step S2.

Meanwhile, when the control unit 10 determines that all lines worth of scanning is complete in step S12 (S12; YES), the control unit 10 causes the light source unit 29 to end the laser beam scanning, and ends the control of correcting the light quantity of the laser beam.

As described above, one example of the optical scanning device according to the present disclosure is configured by comprising an optical scanning device 42, a plurality of correction value storage units 12, and a light quantity correction unit 13.

According to the foregoing embodiment, as shown in FIG. 4, for example, the length of an area in the main scanning direction becomes shorter for areas such as area A1 and area A2 in which the correction value change rate is greater. Accordingly, upon scanning the vicinity of an area with a great correction value change rate, the possibility of scanning a plurality of different areas will increase. Thus, near an area with a great correction value change rate, the light quantity of the laser beam can be corrected suitably with the light quantity correction value DTY associated with each of the plurality of areas. Consequently, it is possible to ensure the accuracy of the light quantity of the laser beam near the area in which the correction value change rate is great.

Figure 6:
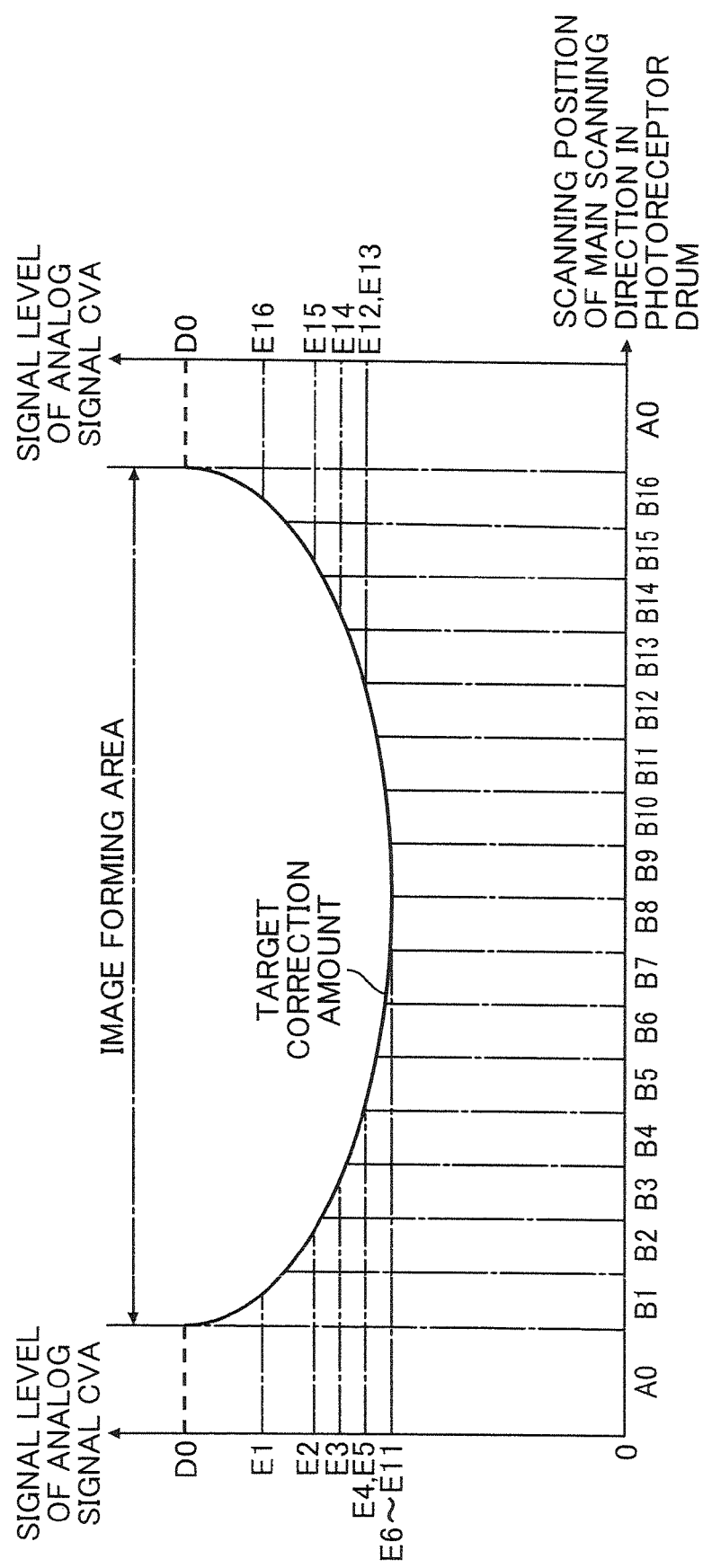
FIG. 6 is an explanatory diagram showing an example of the relation of each area in which the scanning position of the laser beam is evenly divided into a predetermined number on the peripheral face of the photoreceptor drum, and the light quantity correction value stored in each storage unit provided by being associated with each area in the conventional technology.

Meanwhile, FIG. 6 is an explanatory diagram showing, in the image forming area on the peripheral face of the photoreceptor drum in the foregoing conventional technology, an example of the relation of each area in which the scanning position of the laser beam is divided equally into a predetermined number, and the light quantity correction value stored in each storage unit provided in association with each area. In FIG. 6, the image forming area is equally divided into sixteen areas B1 to B16. Each of the sixteen storage units associated respectively with each of the areas B1 to B16 stores each of the light quantity correction values E1 to E16 associated with each of the areas B1 to B16.

Accordingly, when storing each of the light quantity correction values corresponding to each of the areas in the storage units by associating each of the light quantity correction values with each of the areas among the plurality of areas generated by the scanning position of the laser beam on the photoreceptor drum being equally divided in a predetermined number, the length of the area in the main scanning direction is constant regardless of the size of the correction value change rate. Thus, for example, when the resolution of the DA converter 22 is low, the light quantity correction values (E6 to E11 in FIG. 6) of the same value needed to be associated with each of the areas, such as the areas B6 to B11, with a small correction value change rate, and a plurality of storage units for storing the light quantity correction values having the same value needed to be provided redundantly.

Nevertheless, according to the foregoing embodiment, as shown in FIG. 4, for example, the length of areas in the main scanning direction becomes longer for areas such as area A4 and area A5 in which the correction value change rate is smaller. Accordingly, it is possible to reduce the number of registers that need to be provided for storing the light quantity correction values DTY to be associated with the areas near the area with a small correction value change rate. Moreover, even if the length of each of the areas in the main scanning direction is extended, since the correction change rate in each of the areas is small, the possibility of the correction accuracy deteriorating can be reduced.

Moreover, with a standard optical scanning device, the distance of the light path from the light source that outputs the laser beam to the photoreceptor becomes longer for an area that is closer to the both ends of the photoreceptor drum, and the exposure value of the laser beam decreases. Moreover, the variation upon the exposure value of the laser beam decreasing will increase for an area that is closer to the both ends of the photoreceptor drum. Accordingly, upon scanning an area near the both ends of the photoreceptor drum, it becomes necessary to considerably correct the light quantity of the laser beam. Contrarily, the exposure value of the laser beam will increase for an area that is closer to the substantial center of the photoreceptor drum, and the variation when the exposure value of the laser beam increases will decrease. Accordingly, there is no need to considerably correct the light quantity of the laser beam upon scanning an area near the substantial center of the photoreceptor drum.

According to the foregoing embodiment, since an area having a longer length in the main scanning direction is generated for an area that is closer to the substantial center of the photoreceptor drum 43, the number of areas will decrease upon approaching the center part of the photoreceptor drum 43. Contrarily, since an area having a shorter length in the main scanning direction is generated for an area that is closer to the both ends of the photoreceptor drum 43, the number of areas will decrease upon approaching the both ends from the center part of the photoreceptor drum 43. Accordingly, it is possible to reduce the number of light quantity correction values DTY to be associated with the areas near the substantial center of the photoreceptor drum 43 in which the necessity to considerably correct the light quantity of the laser beam is low. Contrarily, it is possible to increase the number of light quantity correction values DTY to be associated with the areas near the both ends of the photoreceptor drum 43 in which the necessity to considerably correct the light quantity of the laser beam is high.

In other words, according to the foregoing embodiment, it is possible to generate an appropriate number of areas according to the characteristics when the variation in the exposure value of the laser beam changes according to the scanning position of the photoreceptor drum 43, and it is thereby possible to store an appropriate number of light quantity correction values DTY.

Moreover, according to the foregoing embodiment, as shown in FIG. 4, the variation in the target correction amount corresponding to each of the areas A1 to A8 within the range of each of the areas A1 to A8 is dD. In other words, the scanning position of the laser beam on the photoreceptor drum 43 is divided into a plurality of areas so that the variation in the target correction amount becomes mutually equal among each of the areas A1 to A8. Thus, upon scanning the photoreceptor drum 43 with a laser beam, after starting the scanning of a certain area, a different area will be scanned at the time that the target correction amount changed by a predetermined variation.

Accordingly, the target correction amount changes by a predetermined variation when a short distance is scanned in an area with a great correction change rate, and the target correction amount changes by a predetermined variation when a long distance is scanned in an area with a small correction change rate. In other words, according to the foregoing embodiment, the scanning position of the laser beam on the photoreceptor drum 43 is appropriately divided so that the length of an area with a great correction change rate in the main scanning direction becomes short, and the length of an area with a small correction change rate in the main scanning direction becomes long. Moreover, since the variation in the target correction amount corresponding to each of the areas is mutually equal, the accuracy of correction of the light quantity in each of the areas becomes unified.

Moreover, according to the foregoing embodiment, as shown in FIG. 4, upon scanning each of the areas A1 to A8, scanning is performed with the light quantity corresponding to the average values D1 to D8 of the target correction amount corresponding to that area. Thus, upon scanning each of the areas A1 to A8, in comparison to the case of scanning with the light quantity corresponding to the maximum value or the minimum value of the target correction amount corresponding to that area, it is possible to reduce the difference between the target correction amount and the light quantity correction value DTY and uniformly correct the light quantity.

Note that the present disclosure can be variously modified without limitation to the configuration of the foregoing embodiment. For example, in the foregoing embodiment, the copying machine 1 was explained as an example of the image forming apparatus comprising the optical scanning device according to the present disclosure. The present disclosure can also be applied to a color printer for color image forming, a facsimile device, a printer device, or a copier device.

Moreover, in the foregoing embodiment, the configuration and numerical examples shown in FIG. 1 to FIG. 6 are merely illustrations of an embodiment according to the present disclosure, and are not intended to limit the present disclosure to the foregoing embodiment. For example, adopted may be a modified embodiment where the plurality of correction value storage units 12 are configured from nonvolatile storage elements such as electrically erasable and programmable read only memory (EEPROM), and a plurality of predetermined storage areas are assigned to the storage elements in substitute for the foregoing plurality of registers.

Moreover, the method of dividing the scanning position of the laser beam into a plurality of areas aligned in the main scanning direction in the image forming area on the photoreceptor drum 43 is not intended to limit the method of performing such division so that the variation in the target correction amount corresponding to each of the areas becomes equal among each of the areas as shown in FIG. 4. For example, it is also possible to adopt a method of predetermining the length of a plurality of different main scanning directions, and performing the division so that, in order from the longest length among the lengths of the plurality of predetermined main scanning direction from the center position of the photoreceptor drum 43 toward the both ends of the photoreceptor drum 43 becomes the length of each of the areas in the main scanning direction.

According to the present disclosure described above, it is possible to provide an optical scanning device and an image forming apparatus capable of reducing the number of storage units of the light quantity correction value.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An optical scanning device, comprising:
a photoreceptor on which a latent image is formed by scanning thereof with a laser beam, a scanning area of the laser beam being divided into a plurality of areas aligned in a main scanning direction;
a light source unit that includes an f-θ lens that images the laser beam entered on the photoreceptor in a spot form, and outputs the laser beam passing through the f-θ lens at a substantially constant velocity, the photoreceptor being scanned in the main scanning direction with the laser beam;
a plurality of correction value storage units, each of which stores a light quantity correction value that is predetermined in association with each of the areas;
a light quantity correction unit which corrects a light quantity when scanning the photoreceptor with the laser beam by using the light quantity correction value stored in the correction value storage unit in association with each of the areas corresponding to the scanning position of the laser beam;
a DA converter that generates an analog signal of a signal level corresponding to the light quantity correction value input from the light quantity correction unit; and a laser control unit that adjusts an amount of a drive current supplied to the light source unit according to the signal level of the analog signal input from the DA converter, wherein a target correction amount for correcting the light quantity is predetermined according to a position of the photoreceptor in the main scanning direction, and the target correction amount changes according to the position of the photoreceptor in the main scanning direction, a length, in the main scanning direction, of each area contained in the plurality of areas is shorter in an area in which a correction value change rate, which is a variation in the target correction amount per unit length of the main scanning direction, is greater, the light quantity correction value is determined based on the target correction amount according to a position of an area corresponding to the light quantity correction value the photoreceptor is provided with an image forming area where the latent image is formed and drawing prohibited areas at both ends of the image forming area and in which the scanning by the laser beam is prohibited, the signal level of the analog signal when the latent image is not formed on the photoreceptor is predetermined as the target correction amount corresponding to a position of each of the drawing prohibited areas, and the plurality of areas are generated by repeatedly dividing the image forming area each time the variation in the target correction amount corresponding to each position within a range from one end to the other end of the image forming area exceeds a specified value.

2. The optical scanning device according to claim 1, wherein
among the plurality of areas, an area closer to a substantial center of the photoreceptor has a longer length in the main scanning direction.

3. The optical scanning device according to claim 1, wherein
the light quantity correction value associated with each of the areas is an average value of the target correction amounts corresponding to the respective areas.

4. An image forming apparatus, comprising:
the optical scanning device according to claim 1; and
an image forming unit which forms, on a sheet, an image corresponding to the latent image by using the latent image formed on the photoreceptor of the optical scanning device.

5. The optical scanning device according to claim 1, wherein
a variation in the target correction amount corresponding to each of the areas within a range of each of the areas is mutually substantially equal among the areas.

* * * * *